US010688868B2

(12) United States Patent
Hayashi et al.

(10) Patent No.: US 10,688,868 B2
(45) Date of Patent: Jun. 23, 2020

(54) ON-VEHICLE DISPLAY CONTROL DEVICE, ON-VEHICLE DISPLAY SYSTEM, ON-VEHICLE DISPLAY CONTROL METHOD, AND NON-TRANSITORY STORAGE MEDIUM

(71) Applicant: JVC KENWOOD Corporation, Yokohama-shi, Kanagawa (JP)

(72) Inventors: Naoto Hayashi, Yokohama (JP); Ichiro Ishida, Yokohama (JP); Yoshiyuki Shimizu, Yokohama (JP); Tsuneo Satomi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/372,457

(22) Filed: Apr. 2, 2019

(65) Prior Publication Data

US 2019/0315228 A1 Oct. 17, 2019

(30) Foreign Application Priority Data

Apr. 16, 2018 (JP) ................... 2018-078525

(51) Int. Cl.
*B60R 1/00* (2006.01)
*B60K 35/00* (2006.01)
(Continued)

(52) U.S. Cl.
CPC ................ *B60K 35/00* (2013.01); *B60R 1/00* (2013.01); *G08G 1/0962* (2013.01); *G08G 1/166* (2013.01);
(Continued)

(58) Field of Classification Search
CPC ............ B60K 35/00; B60K 2370/1868; B60K 2370/176; B60K 2370/733;
(Continued)

(56) References Cited

U.S. PATENT DOCUMENTS

| 7,176,790 B2 * | 2/2007 | Yamazaki | ............. B60Q 9/008 257/60 |
| 10,531,016 B2 * | 1/2020 | Saeki | ................ G06K 9/00805 |
| 2007/0058257 A1 * | 3/2007 | Lynam | ................ B60Q 1/2665 359/604 |
| 2010/0013930 A1 * | 1/2010 | Matsuo | .................... B60R 1/00 348/148 |

(Continued)

FOREIGN PATENT DOCUMENTS

| JP | 2015-079299 | 4/2015 |
| WO | 2015/098156 | 7/2015 |

OTHER PUBLICATIONS

Extended European Search Report for European Patent Application No. 19168485.1 dated May 23, 2019.

*Primary Examiner* — Ryan W Sherwin
(74) *Attorney, Agent, or Firm* — Amin, Turocy & Watson, LLP

(57) ABSTRACT

An on-vehicle display control device includes a video image acquiring unit configured to acquire left and right side rear view video images captured by imaging units configured to capture the left and right side rear view video images of a vehicle, a turning information acquiring unit configured to acquire turning information on the vehicle, and a video image processing unit configured to display, on determining that the vehicle is going to make a turn based on the turning information, the side rear view video image for a turning direction in an area away from a center of the vehicle in a side monitor provided in a turning direction, and the side rear view video image for a direction opposite to the turning direction in an area close to the center of the vehicle in the side monitor provided in the turning direction.

9 Claims, 13 Drawing Sheets

(51) Int. Cl.
*G08G 1/0962* (2006.01)
*G08G 1/16* (2006.01)

(52) U.S. Cl.
CPC .. *B60K 2370/152* (2019.05); *B60K 2370/176* (2019.05); *B60K 2370/1868* (2019.05); *B60K 2370/733* (2019.05); *B60R 2300/105* (2013.01); *B60R 2300/802* (2013.01); *B60R 2300/8066* (2013.01)

(58) Field of Classification Search
CPC ............. B60K 2370/152; G08G 1/166; G08G 1/0962; B60R 1/00; B60R 2300/8066; B60R 2300/802; B60R 2300/105; B60R 11/04; B60R 2300/303; B60R 2300/302; B60R 1/006; B60R 1/007; B60R 1/12; B60R 2001/1215
See application file for complete search history.

(56) References Cited

U.S. PATENT DOCUMENTS

| | | | |
|---|---|---|---|
| 2010/0194596 A1* | 8/2010 | Wang | B60R 1/00 340/936 |
| 2012/0026012 A1* | 2/2012 | Yamashita | B60R 1/00 340/904 |
| 2012/0140074 A1* | 6/2012 | Taguchi | B60R 1/12 348/148 |
| 2012/0268599 A1* | 10/2012 | Schmidt | B60R 1/00 348/148 |
| 2014/0032112 A1* | 1/2014 | Hansen | B60R 1/06 701/533 |
| 2014/0055616 A1* | 2/2014 | Corcoran | H04N 5/247 348/148 |
| 2017/0021769 A1* | 1/2017 | Izumikawa | B60R 1/00 |
| 2018/0040248 A1* | 2/2018 | Bigham | G03B 29/00 |
| 2018/0118130 A1* | 5/2018 | Karabed | B60R 1/00 |

* cited by examiner

# ON-VEHICLE DISPLAY CONTROL DEVICE, ON-VEHICLE DISPLAY SYSTEM, ON-VEHICLE DISPLAY CONTROL METHOD, AND NON-TRANSITORY STORAGE MEDIUM

CROSS-REFERENCE TO RELATED APPLICATION

This application claims priority from Japanese Application No. 2018-078525, filed on Apr. 16, 2018, the contents of which are incorporated by reference herein in its entirety.

FIELD

The present application relates to an on-vehicle display control device, an on-vehicle display system, an on-vehicle display control method, and a non-transitory storage medium.

BACKGROUND

There is a known technology for supporting driving vehicles by displaying images in vicinity of the vehicles. For example, Japanese Laid-open Patent Publication No. 2015-79299 discloses a driving support device that displays a plurality of camera video images indicating a turning direction of a vehicle on making a right or left turn.

For example, in a case of making a left turn, a driver confirms safety in a roll-in direction on making a left turn by using the technology disclosed in Japanese Laid-open Patent Publication No. 2015-79299 and also visually checks this direction. Thus, on making a left turn, the driver is careless about checking a video image displayed on a side monitor that displays a right rear view. In this case, the driver may not perceive another vehicle running from behind on a right side (in a case before making a left turn, on a right front side), a pedestrian, or the like while making the left turn.

SUMMARY

An on-vehicle display control device, an on-vehicle display system, an on-vehicle display control method, and a non-transitory storage medium are disclosed.

According to one aspect, there is provided an on-vehicle display control device comprising: a video image acquiring unit configured to acquire left and right side rear view video images captured by imaging units configured to capture the left and right side rear view video images of a vehicle; a turning information acquiring unit configured to acquire turning information on the vehicle; and a video image processing unit configured to display, on determining that the vehicle is going to make a turn based on the turning information, the side rear view video image for a turning direction in an area away from a center of the vehicle in a side monitor arranged in a turning direction among left and right side monitors provided in the vehicle, and the side rear view video image for a direction opposite to the turning direction in an area close to the center of the vehicle in the side monitor arranged in the turning direction.

According to one aspect, there is provided an on-vehicle display control method comprising: acquiring left and right side rear view video images captured by imaging units configured to capture the left and right side rear view video images of a vehicle; acquiring turning information on the vehicle; and displaying, on determining that the vehicle is going to make a turn based on the turning information, the side rear view video image for a turning direction in an area away from a center of the vehicle in a side monitor arranged in the turning direction among left and right side monitors provided in the vehicle, and the side rear view video image for a direction opposite to the turning direction in an area close to the center of the vehicle in the side monitor arranged in the turning direction.

According to one aspect, there is provided a non-transitory storage medium that stores a program that causes a computer operating as an on-vehicle display device to execute a process comprising: acquiring left and right side rear view video images captured by imaging units configured to capture the left and right side rear view video images of a vehicle; acquiring turning information on the vehicle; and displaying, on determining that the vehicle is going to make a turn based on the turning information, the side rear view video image for a turning direction in an area away from a center of the vehicle in a side monitor arranged in the turning direction among left and right side monitors provided in the vehicle, and the side rear view video image for a direction opposite to the turning direction in an area close to the center of the vehicle in the side monitor arranged in the turning direction.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Figure 1:
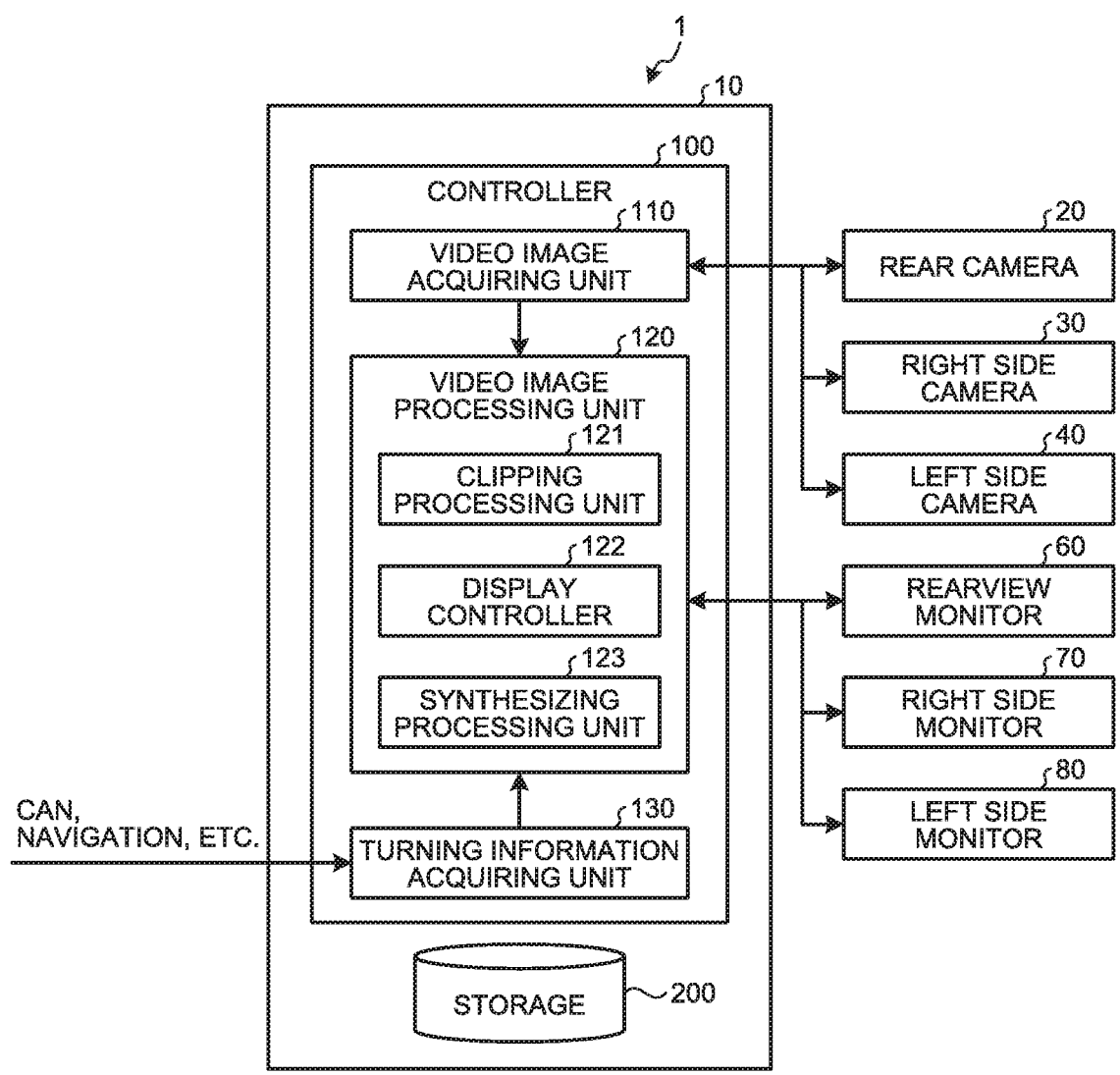
FIG. 1 is a block diagram illustrating a configuration of an on-vehicle display system according to a first embodiment of the present application.

Preferred embodiments of the present application will be described in detail with reference to accompanying drawings. Furthermore, in each of the drawings, components having the same or corresponding function are assigned the same reference numerals and descriptions thereof will be appropriately omitted.

First Embodiment

An on-vehicle display system according to a first embodiment of the present application will be described with reference to FIG. 1 and FIG. 2. FIG. 2 is a schematic diagram illustrating a configuration of the on-vehicle display system according to the first embodiment of the present application.

Figure 2:
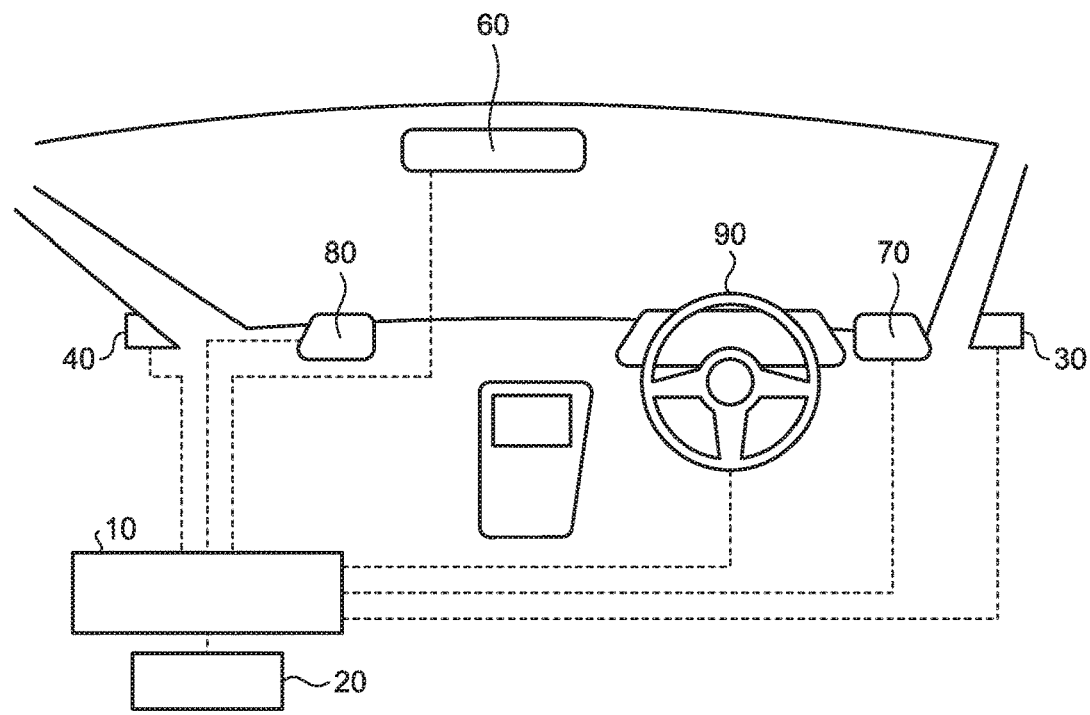
FIG. 2 is a schematic diagram illustrating the configuration of the on-vehicle display system according to the first embodiment of the present application.

As illustrated in FIG. 1 and FIG. 2, an on-vehicle display system 1 includes an on-vehicle display control device 10, a rear camera 20, a right side camera 30, a left side camera 40, a rearview monitor 60, a right side monitor 70, and a left side monitor 80. As will be specifically described later, the on-vehicle display system 1 is mounted on a vehicle and displays, on making a right or left turn, a video image of a rear view in the turning direction in a side monitor arranged in a turning direction, and a video image of a rear view in an opposite direction to the turning direction simultaneously.

The rear camera 20 is arranged so as to face rearward at a rear of the vehicle and captures an image of a rear view of the vehicle. The rear camera 20 has a view angle of, for example, 90° to 135° in the horizontal direction and has the view angle of, for example, 45° to 90° in the vertical direction. The rear camera 20 is capable of capturing a video image in a range greater than a range to be displayed on the rearview monitor 60. However, the rear camera 20 displays a video image in the rearview monitor 60 by clipping an appropriate range for recognizing the rear view in the rearview monitor 60 by a driver of the vehicle. The rear camera 20 outputs the captured rear view video image data to a video image acquiring unit 110.

A description will be given here by referring back to FIG. 1 and FIG. 2. The right side camera 30 is arranged so as to face rearward on a right side of the vehicle and captures an image of a right rear view of the vehicle. The right side camera 30 captures a checking range for the right side monitor 70. The right side camera 30 has a view angle of, for example, 15° to 45° in the horizontal direction and has the view angle of, for example, 15° to 45° in the vertical direction. The right side camera 30 outputs the captured right rear view video image data to the video image acquiring unit 110.

The left side camera 40 is arranged so as to face rearward on a left side of the vehicle and captures an image of a left rear view of the vehicle. The left side camera 40 captures a checking range for the left side monitor 80. The left side camera 40 has a view angle of, for example, 15° to 45° in the horizontal direction and has a view angle of, for example, 15° to 45° in the vertical direction. The left side camera 40 outputs the captured left rear view video image data to the video image acquiring unit 110.

The rearview monitor 60 is, as an example, an electronic rearview mirror. When the rearview monitor 60 is used as an electronic rearview mirror, it does not matter whether or not a half mirror is present for checking a rearward with optical reflection. The rearview monitor 60 is a display including, for example, a liquid crystal display (LCD) or an organic EL (Organic Electro-Luminescence) display. The rearview monitor 60 displays a rear view video image of the vehicle based on a video image signal output from a display controller 122 in the on-vehicle display control device 10. Thus, the rearview monitor 60 is arranged at a position that is easily and visually checked by the driver. In the embodiment, the rearview monitor 60 is arranged in an upper part of a center in a vehicle width direction of a windshield. Alternatively, the rearview monitor 60 may also be embedded in a dashboard or a headliner. The rearview monitor 60 may also be provided with a touch panel.

A size and a shape of the rearview monitor 60 are not limited. For example, the rearview monitor 60 may also have the same size and shape as those of a conventional optical rearview mirror. Alternatively, for example, the rearview monitor 60 may also be wider in the vehicle width direction when compared with a conventional optical rearview mirror. Alternatively, for example, the rearview monitor 60 may also be wider in a vertical direction when compared with a conventional optical rearview mirror.

A description will be given here by referring back to FIG. 1 and FIG. 2. The right side monitor 70 is a display including, for example, a liquid crystal display or an organic EL display. The right side monitor 70 displays a right rear view video image of the vehicle based on a video image signal output from the display controller 122 in the on-vehicle display control device 10. The right side monitor 70 is arranged at a position that is easily and visually checked by the driver. In the embodiment, the right side monitor 70 is arranged on a right side of the dashboard in the vehicle width direction. The right side monitor 70 may also be provided with a touch panel. Furthermore, the right side monitor 70 may also be integrally arranged on the right side of the rearview monitor 60.

The left side monitor 80 is a display including, for example, a liquid crystal display or an organic EL display. The left side monitor 80 displays a left rear view video image of the vehicle based on the video image signal output from the display controller 122 in the on-vehicle display control device 10. The left side monitor 80 is arranged at a position that is easily and visually checked by the driver. In the embodiment, the left side monitor 80 is arranged on a left side of the dashboard in the vehicle width direction. The left side monitor 80 may also be provided with a touch panel.

Furthermore, the left side monitor 80 may also be integrally arranged on the left side of the rearview monitor 60.

In the following, the on-vehicle display control device 10 will be described. The on-vehicle display control device 10 includes a controller 100 and a storage 200.

The controller 100 controls each of the units constituting the on-vehicle display control device 10. Specifically, the controller 100 controls each of the units constituting the on-vehicle display control device 10 by loading and executing programs stored in the storage 200. The controller 100 can be implemented by, for example, an electronic circuit or the like including a central processing unit (CPU). The controller 100 includes a video image acquiring unit 110, a video image processing unit 120, and a turning information acquiring unit 130.

The storage 200 stores therein the programs that are used by the controller 100 to control each of the units included in the on-vehicle display control device 10. The storage 200 is, for example, a semiconductor memory device, such as a random access memory (RAM), a read only memory (ROM), or a flash memory, or a storage device, such as a hard disk, a solid state drive, an optical disk.

The video image acquiring unit 110 acquires video images obtained by capturing a rear view image and side rear view images of the vehicle. Specifically, the video image acquiring unit 110 acquires rear view video image data output by the rear camera 20, the right rear view video image data output by the right side camera 30, and the left rear view video image data output by the left side camera 40. The video image acquiring unit 110 outputs the acquired video image data to the video image processing unit 120.

The video image processing unit 120 includes a clipping processing unit 121, the display controller 122, and a synthesizing processing unit 123. The video image processing unit 120 determines whether the vehicle is making a right or left turn based on, for example, vehicle information acquired by the turning information acquiring unit 130. Specifically, when a steering angle of a steering wheel 90 acquired by the turning information acquiring unit 130 is equal to or greater than a predetermined angle, the video image processing unit 120 determines that the vehicle is making a left or right turn. When, for example, a direction is indicated by a winker, the video image processing unit 120 may also determine that the vehicle is going to make a left or right turn. When location information from the turning information acquiring unit 130 shows an intersection and the vehicle has decelerated to a predetermined speed or less, the video image processing unit 120 may also determine that the vehicle is going to make a left or right turn.

The clipping processing unit 121 clips rear view video image data to be displayed in the rearview monitor 60 from the rear view video image data. The clipping processing unit 121 clips right rear view video image data to be displayed in the right side monitor 70 from the right rear view video image data. The clipping processing unit 121 clips left rear view video image data to be displayed in the left side monitor 80 from the left rear view video image data. The clipping processing unit 121 outputs, on the display controller 122, the clipped rear view video image data, the clipped right rear view video image data, and the clipped left rear view video image data.

When the vehicle makes a right turn, the clipping processing unit 121 clips, from the right rear view video image data, the right rear view video image data for the right turn to be displayed on the right side monitor 70. When the vehicle makes a right turn, the clipping processing unit 121 clips, from the left rear view video image data, the left rear view video image data for the right turn to be displayed on the right side monitor 70. When the vehicle makes a right turn, the clipping processing unit 121 outputs, to the synthesizing processing unit 123, the right rear view video image data for the right turn to be displayed and the left rear view video image data for the right turn to be displayed.

When the vehicle makes a left turn, the clipping processing unit 121 clips, from the right rear view video image data, the right rear view video image data for the left turn to be displayed on the left side monitor 80. When the vehicle makes a left turn, the clipping processing unit 121 clips, from the left rear view video image data, the left rear view video image data for the left turn to be displayed on the left side monitor 80. When the vehicle makes a left turn, the clipping processing unit 121 outputs, to the synthesizing processing unit 123, the right rear view video image data for the left turn to be displayed and the left rear view video image data for the left turn to be displayed.

A range of the right rear view video image data and the left rear view video image data to be clipped by the clipping processing unit 121 on making a right or left turn will be described later.

When the vehicle makes a right turn, the synthesizing processing unit 123 synthesizes the right rear view video image data for the right turn to be displayed with the left rear view video image data for the right turn to be displayed to output the synthesized image to the display controller 122. When the vehicle makes a left turn, the synthesizing processing unit 123 combines the right rear view video image data for the left turn to be displayed and the left rear view video image data for the left turn to be displayed to output the synthesized data to the display controller 122.

By outputting the rear view video image data to be displayed to the rearview monitor 60, the display controller 122 displays the rear view video image captured by the rear camera 20 on the rearview monitor 60. By outputting the right rear view video image data to be displayed to the right side monitor 70, the display controller 122 displays the right rear view video image captured by the right side camera 30 on the right side monitor 70. By outputting the left rear view video image data to be displayed to the left side monitor 80, the display controller 122 displays the left rear view video image captured by the left side camera 40 on the left side monitor 80.

When the vehicle makes a right turn, the display controller 122 outputs, to the right side monitor 70, the right rear view video image data for the right turn to be displayed and the left rear view video image data for the right turn to be displayed that have been synthesized by the synthesizing processing unit 123. Consequently, the display controller 122 displays, in the right side monitor 70, the right rear view video image on making a right turn captured by the right side camera 30 and the left rear view video image on making a right turn captured by the left side camera 40.

When the vehicle makes a left turn, the display controller 122 outputs, to the left side monitor 80, the right rear view video image data for the left turn to be displayed and the left rear view video image data for the left turn to be displayed that have been synthesized by the synthesizing processing unit 123. Consequently, the display controller 122 displays, on the left side monitor 80, the right rear view video image captured by the right side camera 30 on making a left turn and the left rear view video image captured by the left side camera 40 on making a left turn.

The display controller 122 may also output, to the rearview monitor 60, the rear view video image data which is output from the rear camera 20 and acquired by the video image acquiring unit 110, without performing a clipping process by the clipping processing unit 121. The display controller 122 may also output, to the right side monitor 70, the right rear view video image data which is output from the right side camera 30 and acquired by the video image acquiring unit 110, without performing the clipping process by the clipping processing unit 121. The display controller 122 may also output, to the left side monitor 80, the left rear view video image data which is output from the left side camera 40 and acquired by the video image acquiring unit 110, without performing the clipping process by the clipping processing unit 121. A method for the display controller 122 displaying, on the right side monitor 70 or the left side monitor 80, the right rear view video image and the left rear view video image will be described later.

The turning information acquiring unit 130 acquires the vehicle information from navigation information acquired from a Controller Area Network (CAN) or a car navigation device. Specifically, the turning information acquiring unit 130 acquires, as the vehicle information, a vehicle speed of the vehicle, location information, and information related to a steering operation (steering angle). The turning information acquiring unit 130 outputs, for example, the vehicle information to the video image processing unit 120.

Figure 3:
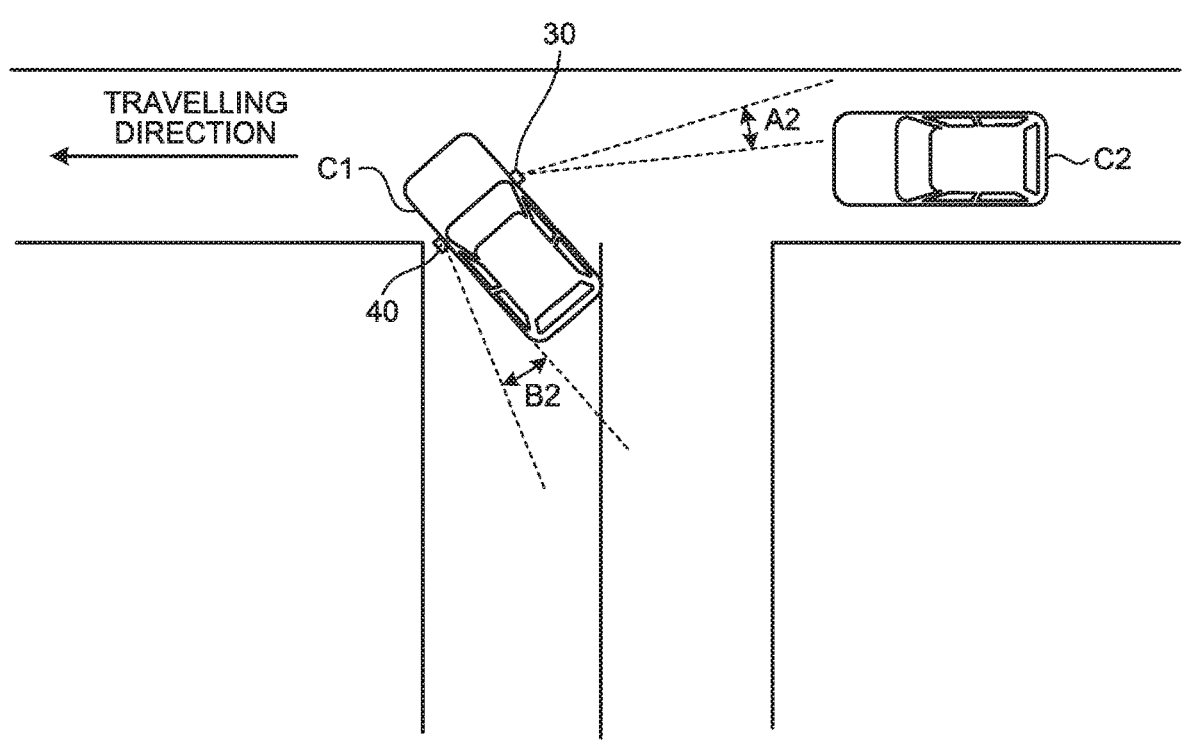
FIG. 3 is a diagram for explaining an operation of an on-vehicle display control device according to the first embodiment of the present application.

An operation in the on-vehicle display control device 10 when the vehicle makes a left turn will be described with reference to FIG. 3. FIG. 3 is a diagram for explaining an operation of the on-vehicle display control device 10 when the vehicle makes a left turn.

In FIG. 3, it is assumed that the on-vehicle display system 1 is mounted on a vehicle C1. When a driver makes a left turn, the driver visually checks a traveling direction of the left turn direction, pedestrians, or the like. Therefore, checking of the right side and the video image displayed on the right side monitor 70 tends to be neglected. When the vehicle C1 makes a left turn, the on-vehicle display control device 10 displays, on the left side monitor 80, the right rear view video image captured by the right side camera 30 in order for a driver to be aware of presence of a vehicle C2. Although a description thereof will be specifically described later, the on-vehicle display control device 10 displays, on the left side monitor 80, the left rear view video image in a range B2 that is captured by the left side camera 40 and that is close to the vehicle C1 and the right rear view video image in a range A2 that is captured by the right side camera 30 and that is away from the vehicle C1.

Figure 4:
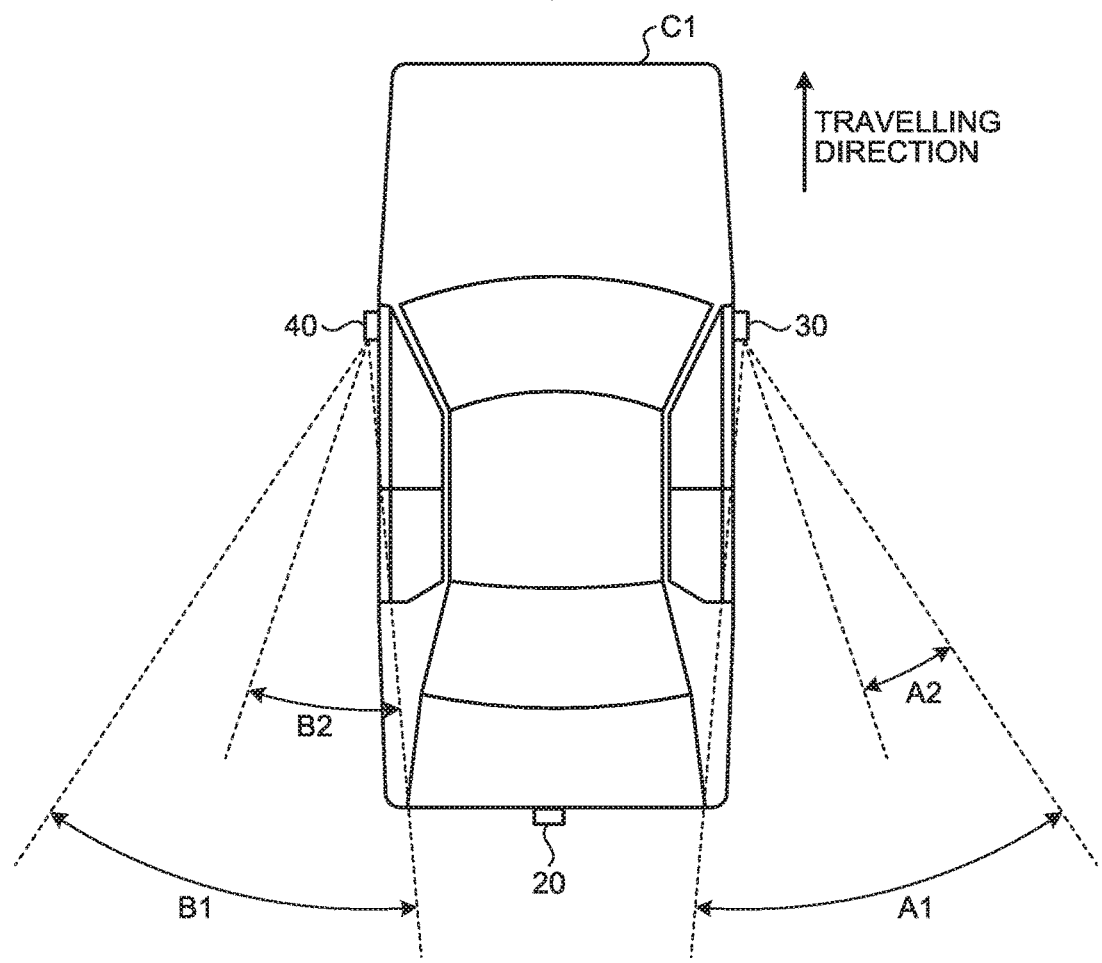
FIG. 4 is a diagram illustrating an example of a range of an image acquired by a right side camera to be displayed on a left side monitor on making a left turn.

A range of the video image to be displayed on the left side monitor 80 on making a left turn will be described with reference to FIG. 4. FIG. 4 is a diagram for explaining the range of the video image in the horizontal direction to be displayed on the left side monitor 80 on making a left turn.

In FIG. 4, a range A1 is a display range of the right rear view displayed in the right side monitor 70 in a case where the vehicle C1 does not make a right or left turn. A range B1 is a range of the left rear view displayed in the left side monitor 80 in a case where the vehicle C1 does not make a right or left turn.

A range A2 is a range of the right rear view video image for the right turn to be displayed on the left side monitor 80 that is captured by the right side camera 30 when the vehicle C1 is making a left turn. Namely, when the vehicle C1 makes a left turn, the video image processing unit 120 displays the video image in a range away from the vehicle C1 in the video image captured by the right side camera 30. This is because the range away from the vehicle C1 corresponds to an area in a right front before making a left turn (for example, corresponds to crossing roads or a pedestrian crossing) and thus it is possible to appropriately detect the vehicle C2 or pedestrians approaching from the right front.

The range B2 is a range of the left rear view video image for the left turn to be displayed on the left side monitor 80 that is captured by the left side camera 40 when the vehicle C1 is making a left turn. Namely, when the vehicle C1 makes a left turn, the video image processing unit 120 displays the video image in a range close to the vehicle C1 in the video images captured by the left side camera 40. This is because the driver gazes at the travelling direction on making a left turn and thus a visual check of a range close to the left side of the vehicle C1 tends to be neglected.

Figure 5:
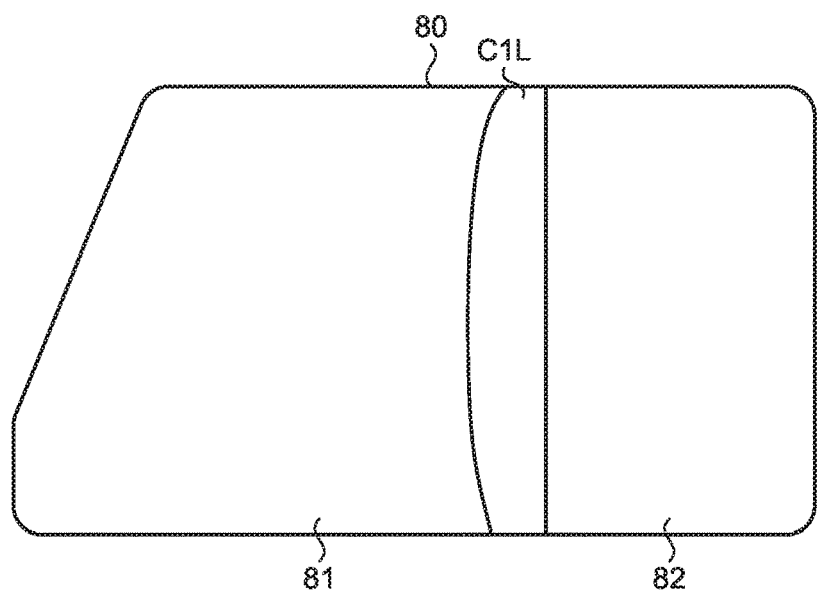
FIG. 5 is a diagram for explaining an image to be displayed on the left side monitor on making a left turn.
Figure 6:
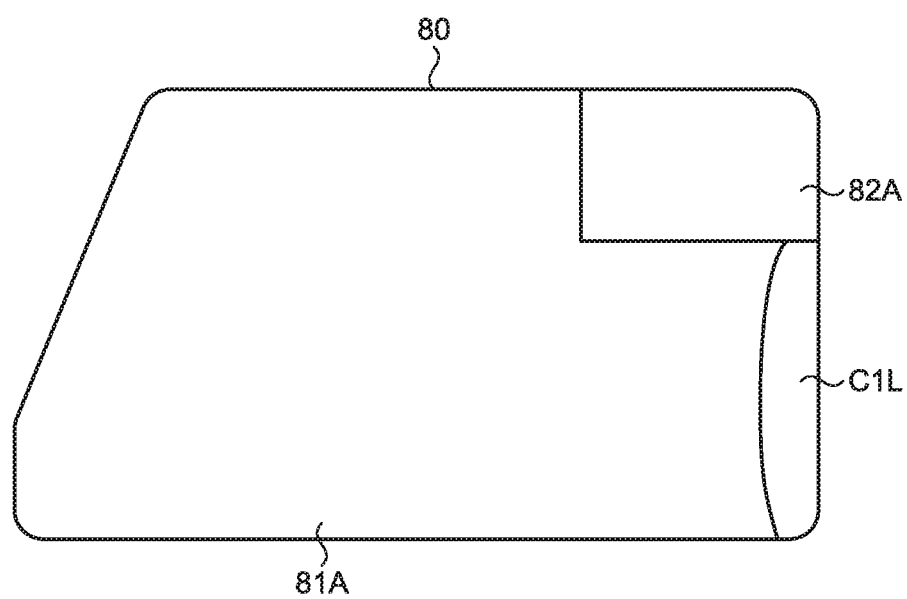
FIG. 6 is a diagram for explaining an image to be displayed on the left side monitor on making a left turn.

A display to be displayed on the left side monitor 80 when the vehicle C1 makes a left turn will be described with reference to FIG. 5 and FIG. 6. FIG. 5 and FIG. 6 are diagrams each illustrating an example of a display to be displayed on the left side monitor 80 when the vehicle C1 makes a left turn.

As illustrated in FIG. 5, when the vehicle makes a left turn, the video image data that is obtained by synthesizing the right rear view video image data for the left turn with the left rear view video image data for the left turn by the synthesizing processing unit 123 is displayed on the left side monitor 80. In FIG. 5, a first display area 81, which is divided along the vertical direction of the left side monitor 80, is an area in which the left rear view video image data for the left turn is to be displayed, whereas a second display area 82 is an area in which the right rear view video image data for the left turn is to be displayed. Namely, the video image processing unit 120 displays, on the second display area 82, a video image obtained by clipping, for example, at least a part of the video image to be displayed on the right side monitor 70. Specifically, in a case of making a left turn, the video image processing unit 120 displays the left rear view video image for the left turn in an area away from the center of the vehicle C1 in the left side monitor 80. In a case of making a left turn, the video image processing unit 120 displays the right rear view video image for the left turn in an area close to the center of the vehicle C1 in the left side monitor 80. In a case where the vehicle C1 makes a right turn, the video image processing unit 120 performs an operation by inverting left and right on the operation when the vehicle C1 makes a left turn. Namely, in a case of making a right or left turn, the video image processing unit 120 displays the side rear view video image for the turning direction in the area away from the vehicle C1 in the side monitor in the turning direction. Then, in a case of making a right or left turn, the video image processing unit 120 displays the side rear view video image for the direction opposite to the turning direction in the area close to the center of the vehicle C1 in the side monitor in the turning direction.

It is preferable that the video image processing unit 120 display, on the first display area 81, at least a part of a left side portion C1L of the vehicle C1 such that a boundary between the first display area 81 and the second display area 82 is clear. It is preferable a size of the first display area 81 be greater than that of the second display area 82. A ratio of the first display area 81 to the second display area 82 is about, for example, 3:1. Furthermore, a method for displaying an image on the left side monitor 80 by dividing the image into the side rear view video image in the left direction and the side rear view video image in the right direction is not limited to the method illustrated in FIG. 5.

FIG. 6 is a diagram illustrating the left side monitor 80 divided by using a different pattern from the pattern illustrated in FIG. 5. As illustrated in FIG. 6, the left side monitor 80 includes a first display area 81A and a second display area 82A. As illustrated in FIG. 6, the second display area 82A for displaying the right rear view video image may also be an area enclosed by a small square. In this case, the video image processing unit 120 displays, on the second display area 82A, a video image obtained by, for example, reducing the size of the video image displayed on the right side monitor 70.

Figure 7:
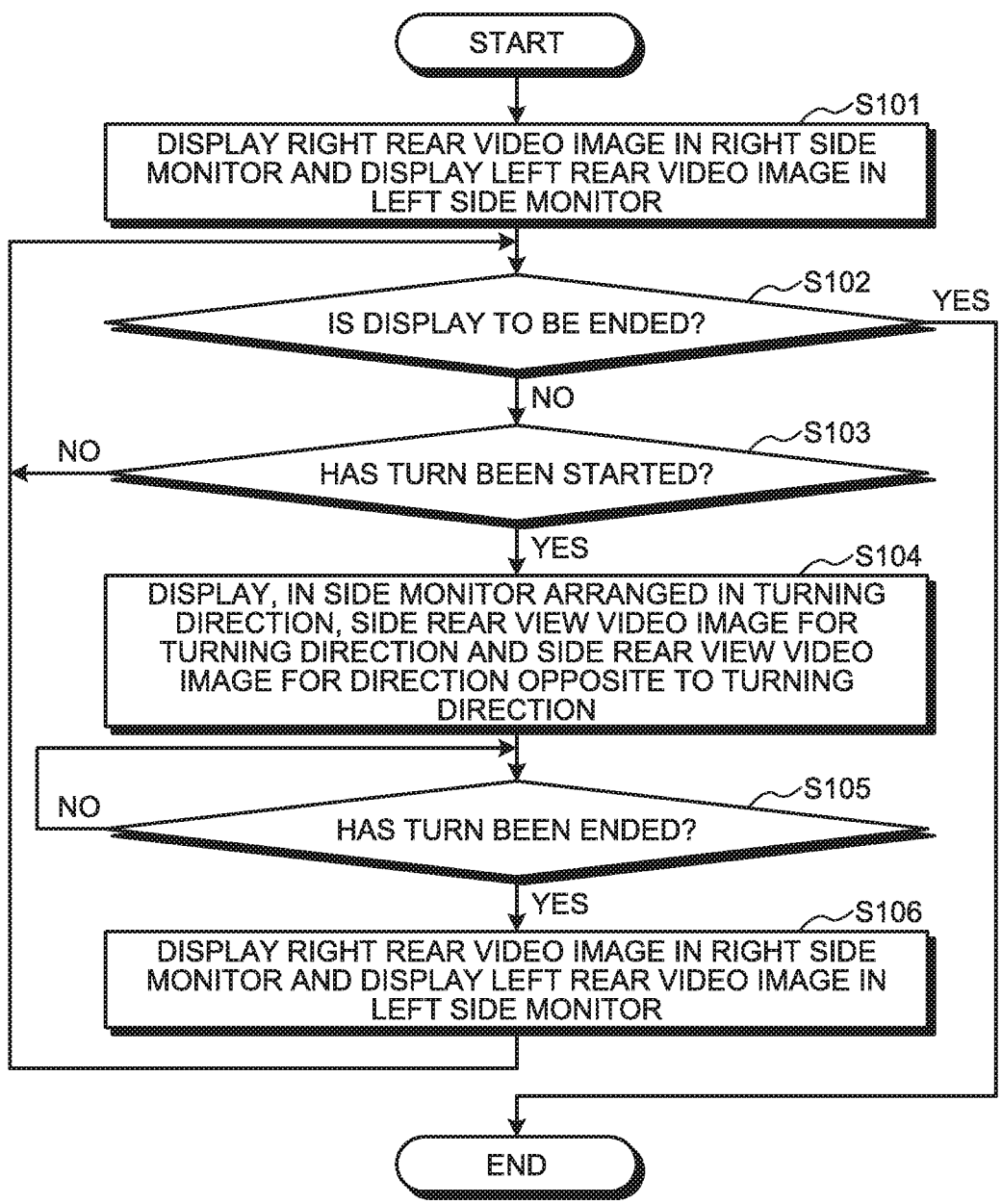
FIG. 7 is a flowchart illustrating an example of flow of processes performed by the on-vehicle display control device according to the first embodiment of the present application.

The operation of the controller 100 in the on-vehicle display control device 10 will be described with reference to FIG. 7. FIG. 7 is a flowchart illustrating an example of flow of processes of the controller 100.

First, the controller 100 displays the right rear view video image in the right side monitor 70 and displays the left rear view video image in the left side monitor 80 (Step S101). Then, the controller 100 proceeds to Step S102. In the process at Step S101, when the vehicle enters an operable state, such as an engine of the vehicle has been turned on, a display of the right rear view video image in the right side monitor 70 and a display of a left rear view video image in the left side monitor 80 are started. After the process at Step S101 has been ended, the controller 100 determines whether the display started at Step S101 is to be ended (Step S102). In the determination at Step S102, the controller 100 determines that the display is to be ended when the operation of the vehicle has been ended, such as a case in which the engine of the vehicle has been turned off (Yes at Step S102).

While the display started at Step S101 continues (No at Step S102), the controller 100 determines, based on the vehicle information, whether the vehicle starts a turn (Step S103). The determination by the controller 100 whether the vehicle starts a turn is performed based on the steering angle information on the vehicle acquired by the turning information acquiring unit 130, route guidance information acquired from the location information on the vehicle and a car navigation device, or the like. Specifically, the controller 100 determines that a turn has been started when the steering angle information on the vehicle indicates a predetermined value equal or more.

It may also be possible to add, to the determination at Step S103, the determination whether the current location is an intersection. In this case, it may also be possible for the controller 100 to acquire the steering angle in a case where, for example, the current location is the intersection and not to acquire the steering angle in a case where the current location is not the intersection. Furthermore, the controller 100 may also determine that a turn has been started in a case where the current location of the vehicle is positioned located just before an intersection in which a turn is to be made based on the route guide obtained by the navigation device. In this case, even when the vehicle does not actually start a turn, it may also be possible to assume that a turn starts before a predetermined distance that is, for example, 5 m short of a scheduled turning position. Furthermore, the controller 100 may also determine that a turn has been started based on operation information on a blinker when the current location is located just before an intersection. When the controller 100 determines that a turn has been started (Yes at Step S103), the controller 100 proceeds to Step S104. When the controller 100 determines that a turn has not been started (No at Step S103), the controller 100 proceeds the process to Step S102.

When the controller 100 determines that a turn has been started (Yes at Step S103), the controller 100 proceeds to Step S104 and displays, in the side monitor arranged in the turning direction, the side rear view video image for the turning direction and the side rear view video image for the direction opposite to the turning direction (Step S104). Then, the controller 100 proceeds to Step S105.

The controller 100 determines, based on the vehicle information, whether a turn has been ended (Step S105). When it is determined that a turn has been ended (Yes at Step S105), the controller 100 proceeds to Step S106, displays the right rear view video image in the right side monitor 70, displays the left rear view video image in the left side monitor 80 (Step S106), and then proceeds to Step S102. Then, the controller 100 determines whether the display started at Step S101 is to be ended and, if it is determined to be ended (Yes at Step S102), the controller 100 ends the process illustrated in FIG. 7.

As described above, in the embodiment, when a vehicle makes a turn, it is possible to display, in the side monitor arranged in the turning direction, the side rear view video image for the turning direction and the side rear view video image for the direction opposite to the turning direction. Consequently, since a driver can check the side rear view video image for the direction opposite to the turning direction on making a right or left turn, the driver can drive the vehicle safely. Thus, in the embodiment, this is particularly useful on making a right or left turn at an intersection.

Modification of the Side Monitor

In the first embodiment, the right side monitor 70 and the left side monitor 80 are separately provided. However, this is an example and does not limit the present application. The right side monitor 70 and the left side monitor 80 may also be integrally provided.

Figure 8:
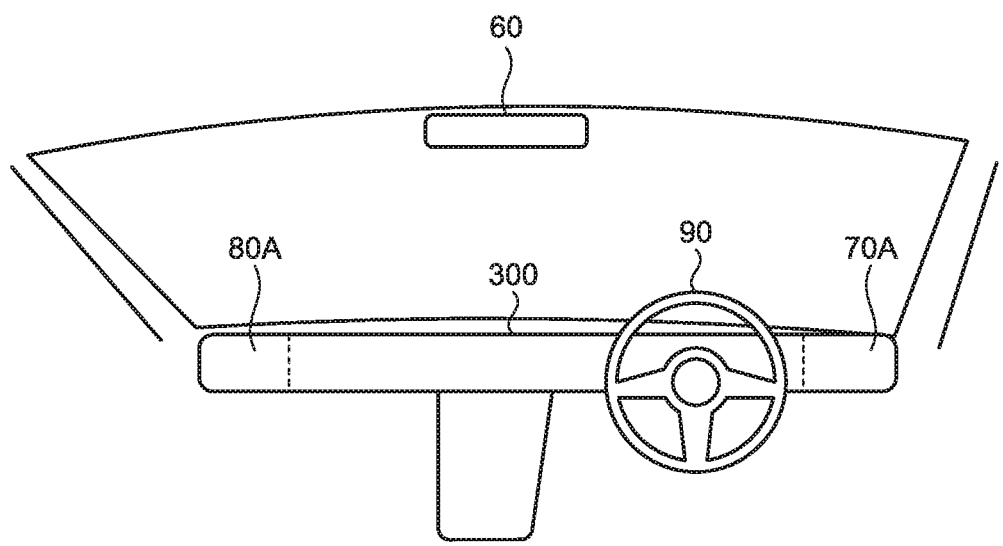
FIG. 8 is a schematic diagram illustrating an example of a configuration in which the left side monitor and a right side monitor are integrally provided.

An example of a configuration in which the right side monitor and the left side monitor are integrally provided will be described with reference to FIG. 8. FIG. 8 is a schematic diagram illustrating an example of a configuration in which the left side monitor and the right side monitor are integrally provided.

As illustrated in FIG. 8, in a modification of the first embodiment, for example, a laterally-long electronic monitor 300 is provided in a dashboard, which is disposed in front of the steering wheel 90, over a range from a left end portion to a right end portion of the dashboard.

The electronic monitor 300 is a display including, for example, a liquid crystal display, an organic EL display, or the like. In the electronic monitor 300, a right direction portion viewed from the steering wheel 90 functions as a right side monitor 70A, whereas a left direction portion viewed from the steering wheel 90 functions as a left side monitor 80A. In the example illustrated in FIG. 8, the right side monitor 70A corresponds to the right end portion of the electronic monitor 300, whereas the left side monitor 80A corresponds to the left end portion of the electronic monitor 300. In this case, the video image processing unit 120 displays the right rear view video image in the right side monitor 70A, and displays the left rear view video image in the left side monitor 80A.

Figure 9:
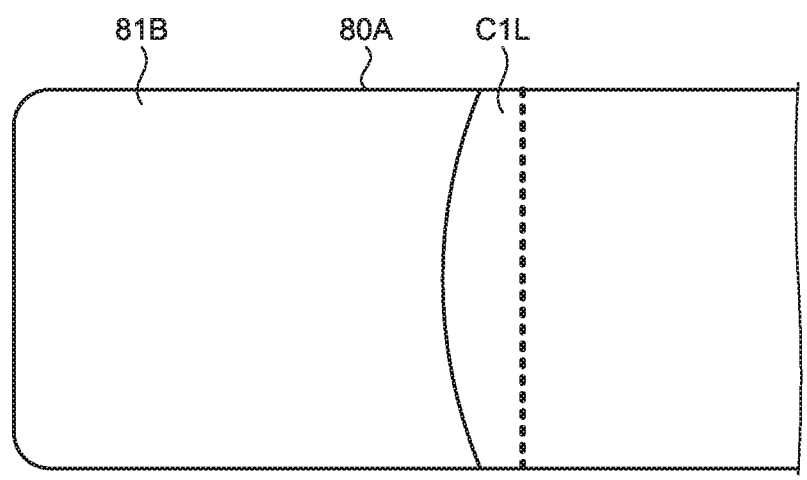
FIG. 9 is a diagram illustrating an example of a display to be displayed on the left side monitor on not making a right or left turn.
Figure 10:
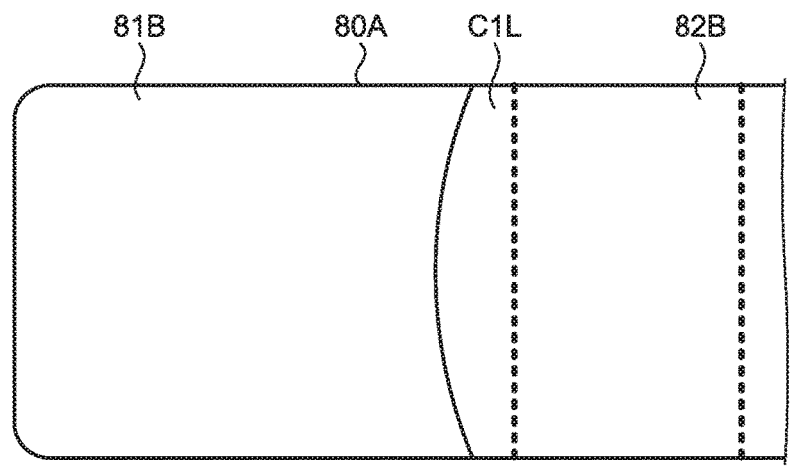
FIG. 10 is a diagram illustrating an example of a display to be displayed on the left side monitor on making a left turn.

In the following, a display to be displayed on the left side monitor 80A when the vehicle C1 is travelling will be described with reference to FIG. 9 and FIG. 10. FIG. 9 is a diagram illustrating an example of a display to be displayed on the left side monitor 80A in a case where the vehicle C1 does not make a right or left turn. FIG. 10 is a diagram illustrating an example of the display to be displayed on the left side monitor 80A in a case where the own vehicle C1 is making a left turn.

As illustrated in FIG. 9, in the left side monitor 80A, when the vehicle C1 does not make a right or left turn, a first display area 81B functions as the left side monitor 80A. In this case, the video image processing unit 120 displays the left rear view video image in the first display area 81B. The display range of the left rear view video image to be displayed on the first display area 81B is preferably a range including the left side portion C1L of the vehicle C1.

As illustrated in FIG. 10, in the left side monitor 80A, when the vehicle C1 makes a left turn, the first display area 81B and a second display area 82B function as the left side monitor 80A. In this case, the video image processing unit 120 displays the left rear view video image in the first display area 81B and displays the right rear view video image in the second display area 82B. Here, since the electronic monitor 300 is a laterally-long electronic monitor, the video image processing unit 120 may also display the right rear view video image in the second display area 82B that is adjacent to the first display area 81B while maintaining the display range of the first display area 81B without reducing the display range of the first display area 81B. Namely, the video image processing unit 120 can display the right rear view video image without reducing the display range of the left rear view video image in the lateral direction. In this case, the video image processing unit 120 may also display, on the second display area 82B, the right rear view video image that is to be displayed on the right side monitor 70A without processing anything or may also a part of the right rear view video image.

Second Embodiment

In the following, an operation performed in the on-vehicle display control device 10 according to a second embodiment of the present application will be described. In the second embodiment, the video images captured by the right side camera 30 and the left side camera 40 are clipped by the clipping processing unit 121 and are displayed on the right side monitor 70 or the left side monitor 80. The configuration of the on-vehicle display control device 10 according to the second embodiment is the same as that of the on-vehicle display control device 10 according to the first embodiment.

Figure 11:
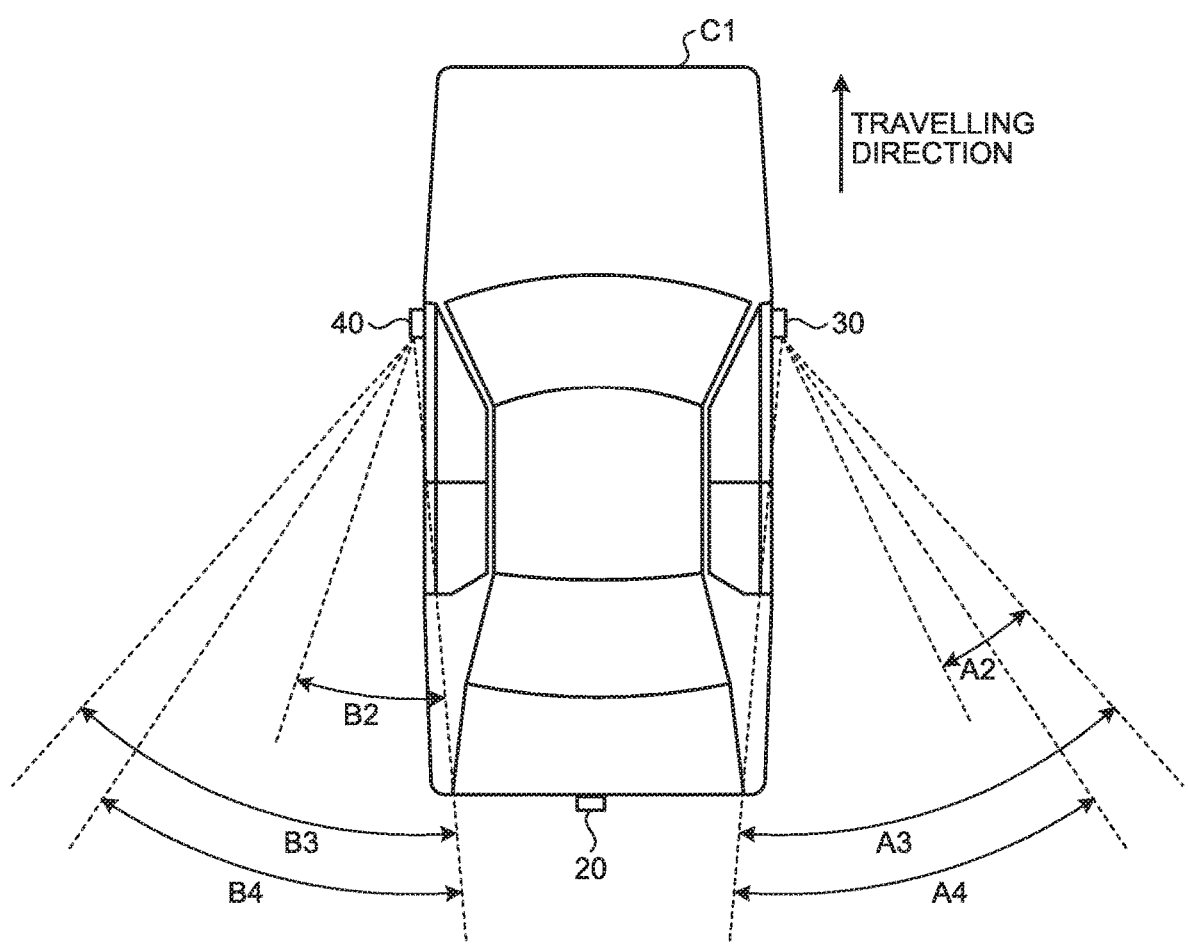
FIG. 11 is a diagram illustrating an example of the range of the image acquired by the right side camera to be displayed on the left side monitor, on making a left turn, by an on-vehicle display control device according to a second embodiment of the present application.

An operation, performed by the clipping processing unit 121, of clipping the video image captured by the right side camera 30 and the left side camera 40 will be described with reference to FIG. 11. FIG. 11 is a schematic diagram illustrating a range to be clipped, by the clipping processing unit 121, from the video image captured by the right side camera 30 and the left side camera 40.

First, an operation performed in the on-vehicle display control device 10 in a case where the vehicle C1 does not make a right or left turn will be described.

As illustrated in FIG. 11, the right side camera 30 captures the right rear view video image in a range A3. In a case where, for example, the vehicle C1 does not make a right or left turn, the clipping processing unit 121 clips a range A4 included in the range A3 and generate rear view video image data to be displayed. In this case, the clipping processing unit 121 outputs the right rear view video image data to be displayed in the range A4 to the display controller 122. Then, the display controller 122 displays the right rear view video image to be displayed in the range A4 on the right side monitor 70. The right side camera 30 may also change the range A4 based on the location information or speed information.

The left side camera 40 captures the left rear view video image in a range B3. In a case where, for example, the vehicle C1 does not make a right or left turn, the clipping processing unit 121 generates left rear view video image data to be displayed by clipping a range B4 included in the range B3. In this case, the clipping processing unit 121 outputs the left rear view video image data to be displayed in the range B4 to the display controller 122. Then, the display controller 122 displays the left rear view video image to be displayed in the range B4 on the left side monitor 80.

In the following, an operation performed in the on-vehicle display control device 10 in a case where the own vehicle C1 makes a left turn will be described.

When the vehicle C1 makes a left turn, the clipping processing unit 121 generates right rear view video image data for the left turn to be displayed by clipping a range A2 included in the range A3 captured by the right side camera 30. Namely, when the vehicle C1 makes a left turn, the clipping processing unit 121 clips a video image in an area away from the vehicle C1 in the right rear view video image. In this case, the clipping processing unit 121 outputs the right rear view video image data for the left turn to be displayed in the range A2 to the synthesizing processing unit 123. Then, the display controller 122 displays the video image in the area away from the vehicle C1 in the right rear view video image in, for example, the second display area 82 in the left side monitor 80 illustrated in FIG. 5.

When the vehicle C1 makes a left turn, the clipping processing unit 121 generates left rear view video image data for the left turn to be displayed in a range B2 included in the range B3 captured by the left side camera 40. Namely, when the vehicle C1 makes a left turn, the clipping processing unit 121 clips a video image in an area close to the vehicle C1 in the left rear view video image. In this case, the clipping processing unit 121 outputs the left rear view video image data for the left turn to be displayed in the range B2 to the synthesizing processing unit 123. Then, the synthesizing processing unit 123 synthesizes the right rear view video image data for the left turn to be displayed and the left rear view video image data for the left turn to be displayed, and then the display controller 122 displays the video image synthesized by the synthesizing processing unit 123 on the left side monitor 80 illustrated in, for example, FIG. 5. In this case, the video image in the area away from the vehicle C1 in the right rear view video image is displayed on the second display area 82 in the left side monitor 80, whereas the video image in the area close to the vehicle C1 in the left rear view video image is displayed on the first display area 81 in the left side monitor 80.

On making a right or left turn, the clipping processing unit 121 may also change the range of the video image to be clipped in accordance with a rotation angle for the turning direction acquired from the turning information acquiring unit 130. For example, when referring to FIG. 3, the range close to the vehicle C1 in the range A3 is clipped when the own vehicle C1 has started to make a left turn. Then, when the own vehicle C1 is making a left turn, in order to detect the vehicle C2 approaching from the right direction, the clipping processing unit 121 clips the video image in the area away from the vehicle C1 in the range A3. Then, in order to detect a rapidly approaching motorbike or the like at the end of a left turn, the clipping processing unit 121 may also clip the range close to the vehicle C1 in the range A3. Consequently, the video image processing unit 120 displays, on the left side monitor 80, the right rear view video image in a range that is different according to the turning angle. Namely, the clipping processing unit 121 may also change the range to be clipped in accordance with the running status of the vehicle C1.

Figure 12:
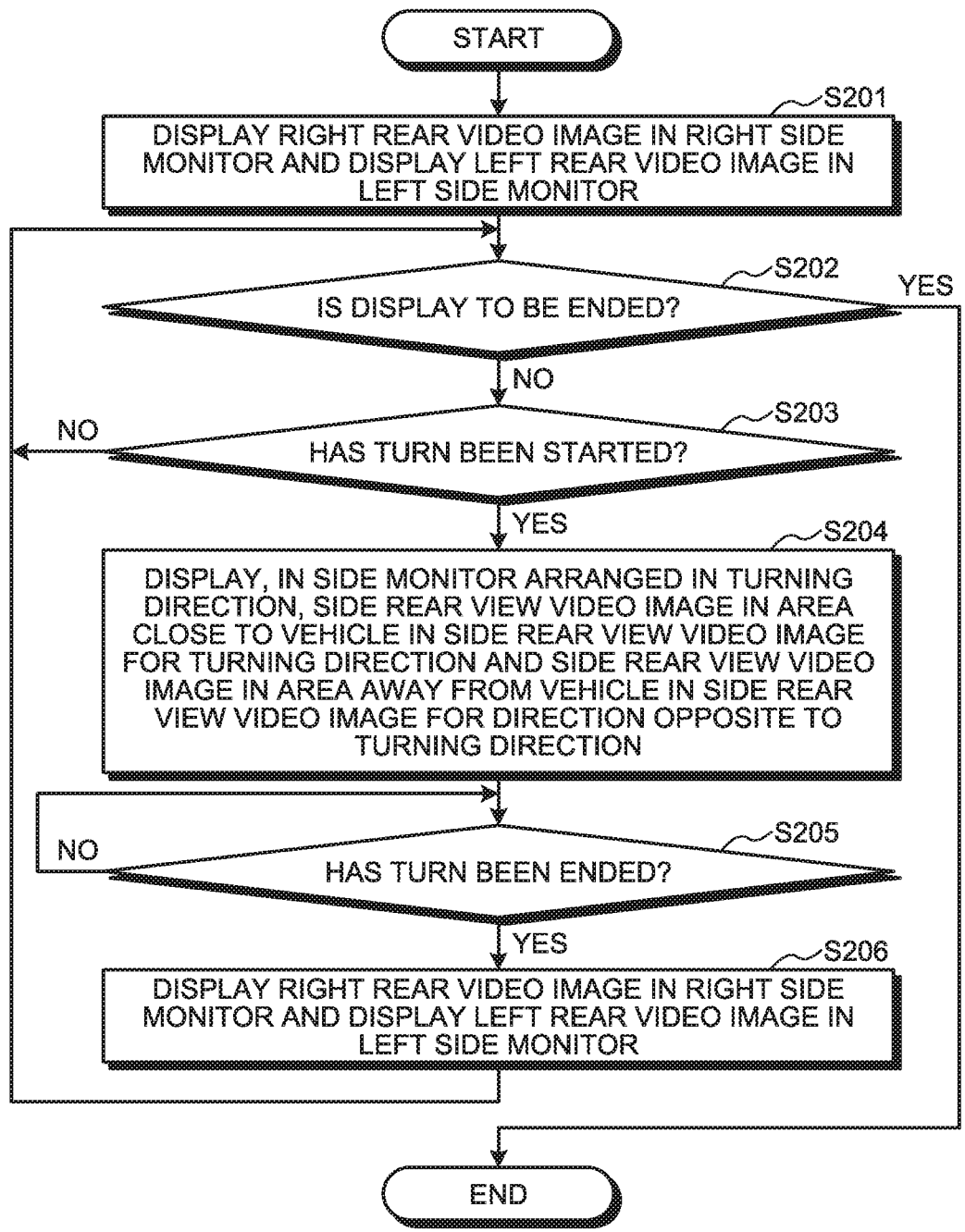
FIG. 12 is a flowchart illustrating an example of flow of processes performed by the on-vehicle display control device according to the second embodiment of the present application.

An operation performed in the controller 100 according to the second embodiment will be described with reference to FIG. 12. FIG. 12 is a diagram for explaining an example of flow of processes performed in the controller 100 according to the second embodiment. In the processes illustrated in FIG. 12, the descriptions of the same processes as those illustrated in FIG. 7 will be omitted. The processes at Step S201, Step S202, Step S203, Step S205, and Step S206 illustrated in FIG. 12 are the same as the processes at Step S101, Step S102, Step S103, Step S105, and Step S106 illustrated in FIG. 7.

When the controller 100 determines that a turn has been made (Yes at Step S203), the controller 100 proceeds to Step S204 and displays, in the side monitor arranged in the turning direction, the side rear view video image in the area close to the vehicle in the side rear view video image for the turning direction and the side rear view video image in the area away from the vehicle in the side rear view video image for the direction opposite to the turning direction (Step S204). Then, the controller 100 proceeds to Step S205.

As described above, in the embodiment, when the vehicle makes a turn, it is possible to display, in the side monitor arranged in the turning direction, the side rear view video image in the area close to the vehicle for the turning direction, and the side rear view video image in the area away from the vehicle for the direction opposite to the turning direction. Consequently, since the driver can check the side rear view video image in the direction opposite to the turning direction, the driver can drive the vehicle safely.

Third Embodiment

In the following, an operation of the on-vehicle display control device 10 according to a third embodiment of the present application will be described. In the third embodiment, in a case of, for example, parking a vehicle in a garage by moving the vehicle backward, the video images captured by the right side camera 30 and the left side camera 40 are displayed on the right side monitor 70 and the left side monitor 80, respectively. The configuration on the on-vehicle display control device 10 according to the third embodiment is the same as that of the on-vehicle display control device 10 according to the first embodiment.

Figure 13:
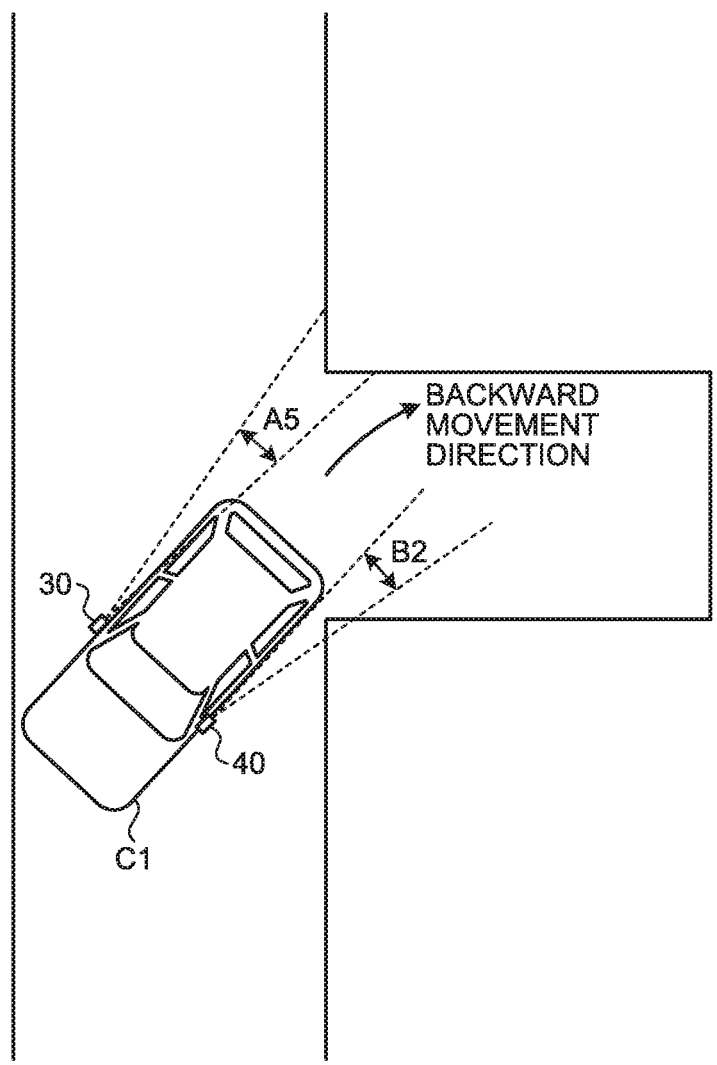
FIG. 13 is a diagram illustrating an operation of the on-vehicle display control device according to a third embodiment of the present application.

The ranges to be displayed on the right side monitor 70 and the left side monitor 80 in a case of, for example, parking a vehicle in a garage by moving the vehicle backward will be described with reference to FIG. 13. FIG. 13 is a schematic diagram for explaining the ranges to be displayed on the right side monitor 70 and the left side monitor 80 in a case where the vehicle moves backward.

FIG. 13 illustrates a case in which the vehicle is parked in a garage by moving the vehicle backward by turning a steering wheel to the left. In this case, in order for the driver to grasp a positional relationship between the vehicle C1 and a side wall of the garage, the side rear view video image in the area close to the vehicle C1 is displayed on the right side monitor 70 and the left side monitor 80 by the video image processing unit 120. Then, it is preferable to display, on the right side monitor 70, a lower side of the vehicle C1 in order for the driver to grasp an obstacle or the like in a path through which a right rear tire of the vehicle C1 passes. Namely, the lower side of the vehicle C1 is displayed in an inner circumferential side of the turning direction on backward movement.

Figure 14:
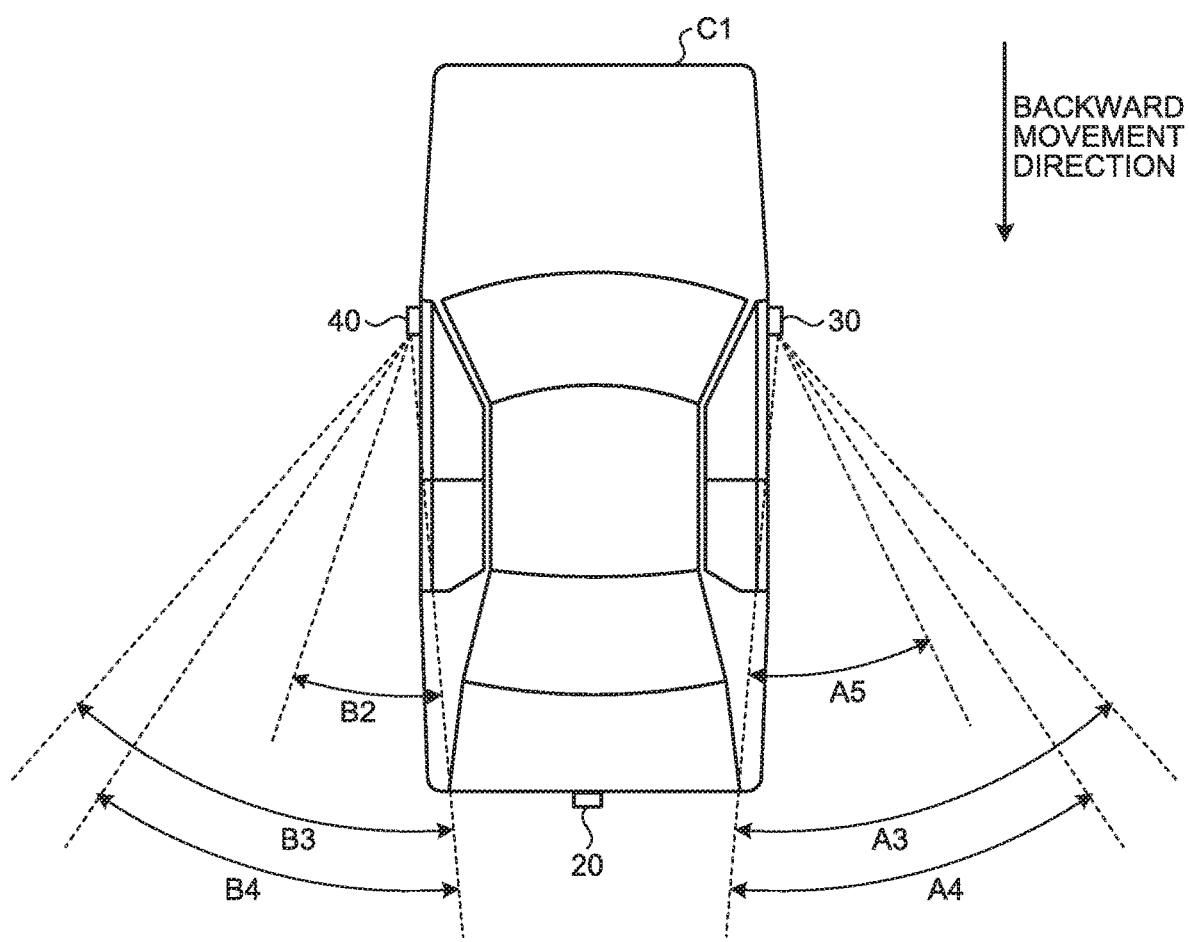
FIG. 14 is a diagram illustrating an example of the range of the image acquired by the right side camera to be displayed on the left side monitor, on making a left turn, by the on-vehicle display control device according to the third embodiment of the present application.

In a case where the vehicle C1 moves backward, it may also be possible to clip the video images captured by the right side camera 30 and the left side camera 40 and display the clopped images on the right side monitor 70 and the left side monitor 80, respectively. FIG. 14 is a schematic diagram illustrating the ranges to be clipped, by the clipping processing unit 121, from the video images captured by the right side camera 30 and the left side camera 40 in a case where the vehicle moves backward by turning the steering wheel to the left.

As illustrated in FIG. 14, the right side camera 30 captures the right rear view video image in the range A3. In a case where, for example, the vehicle C1 moves backward, the clipping processing unit 121 generates right rear view video image data for the backward movement to be displayed on moving backward of the vehicle by clipping a range A5 close to the vehicle in the range A3. At this time, the clipping processing unit 121 preferably clips the video image in the lower side (on the tire side) in the range A5. The clipping processing unit 121 may also clip the video image in the lower side (on the tire side) in the range A5 by enlarging the video image. The clipping processing unit 121 outputs the right rear view video image data for the backward movement to be displayed in the range A5 to the display controller 122.

The left side camera 40 captures the left rear view video image in the range B3. In a case where, for example, the vehicle C1 moves backward, the clipping processing unit 121 generates left rear view video image data for the backward movement to be displayed on moving backward of the vehicle by clipping a range B2 in the range B3. The clipping processing unit 121 outputs the left rear view video image data for the backward movement to be displayed in the range B2 to the display controller 122. Then, the video image processing unit 120 synthesizes these pieces of the video image data and displays the right rear view video image for the backward movement to be displayed in the range A5 and the left rear view video image for the backward movement to be displayed in the range B2 on the left side monitor 80.

A method for displaying the video image in the left side monitor 80 performed by the video image processing unit 120 is the same as that in a case of making a right or left turn. Therefore, a description thereof will be omitted.

Figure 15:
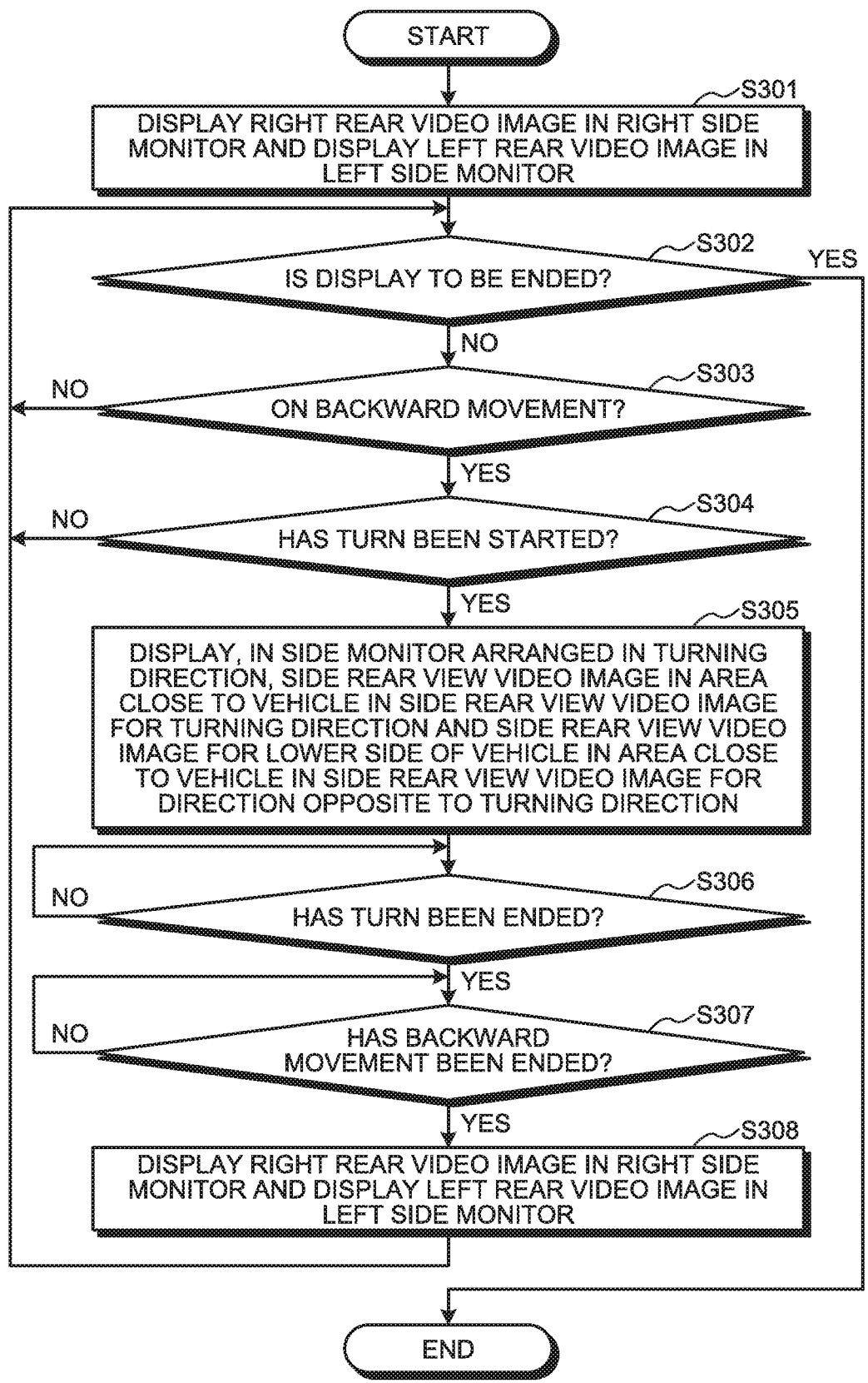
FIG. 15 is a flowchart illustrating an example of flow of processes performed by the on-vehicle display control device according to the third embodiment of the present application.

An operation performed in the controller 100 according to the third embodiment will be described with reference to FIG. 15. FIG. 15 illustrates for explaining an example of flow of processes performed in the controller 100 according to the third embodiment.

In the processes illustrated in FIG. 15, the descriptions of the same processes as those illustrated in FIG. 7 will be omitted. The processes at Step S301 and Step S302 illustrated in FIG. 15 are the same as the processes at Step S101 and Step S102 illustrated in FIG. 7. The process at Step S304 illustrated in FIG. 15 is the same as the process at Step S103 illustrated in FIG. 7. The process at Step S306 illustrated in FIG. 15 is the same as the process at Step S105 illustrated in FIG. 7. And the process at Step S308 illustrated in FIG. 15 is the same as the process at Step S106 illustrated in FIG. 7.

While the display started at Step S301 continues (No at Step S302), the controller 100 determines, based on the vehicle information, whether the vehicle is going to move backward (Step S303). In the determination at Step S303, when, for example, a reverse gear has been selected, the controller 100 determines that the vehicle moves backward. When the controller 100 determines that the vehicle moves backward (Yes at Step S303), the controller 100 proceeds to Step S304, whereas the controller 100 determines that the vehicle does not move backward (No at Step S303), the controller 100 proceeds to Step S302.

At Step S305, the controller 100 displays, in the side monitor arranged in the turning direction, the side rear view video image in the area close to the vehicle in the side rear view video image for the turning direction and the side rear view video image for the lower side of the vehicle in the area close to the vehicle in the side rear view video image for the direction opposite to the turning direction. Then, the controller 100 proceeds to Step S306.

At Step S306, when the controller 100 determines that a turn has been ended (Yes at Step S306), the controller 100 proceeds to Step S307. At Step S307, when the controller 100 determines that the backward movement has been ended (Yes at Step S307), the controller 100 proceeds to Step S308.

As described above, in the embodiment, when the vehicle makes a turn in a case of, for example, parking in the garage by moving backward, it is possible to display, in the side monitor arranged in the turning direction, the side rear view video image in the area close to the vehicle in the turning direction and the side rear view video image in the area close to the vehicle in the direction opposite to the turning direction and located in the lower side. Consequently, since the driver can check the side rear view video image in the side of the direction opposite to the turning direction, the driver can drive the vehicle safely.

Fourth Embodiment

Figure 16:
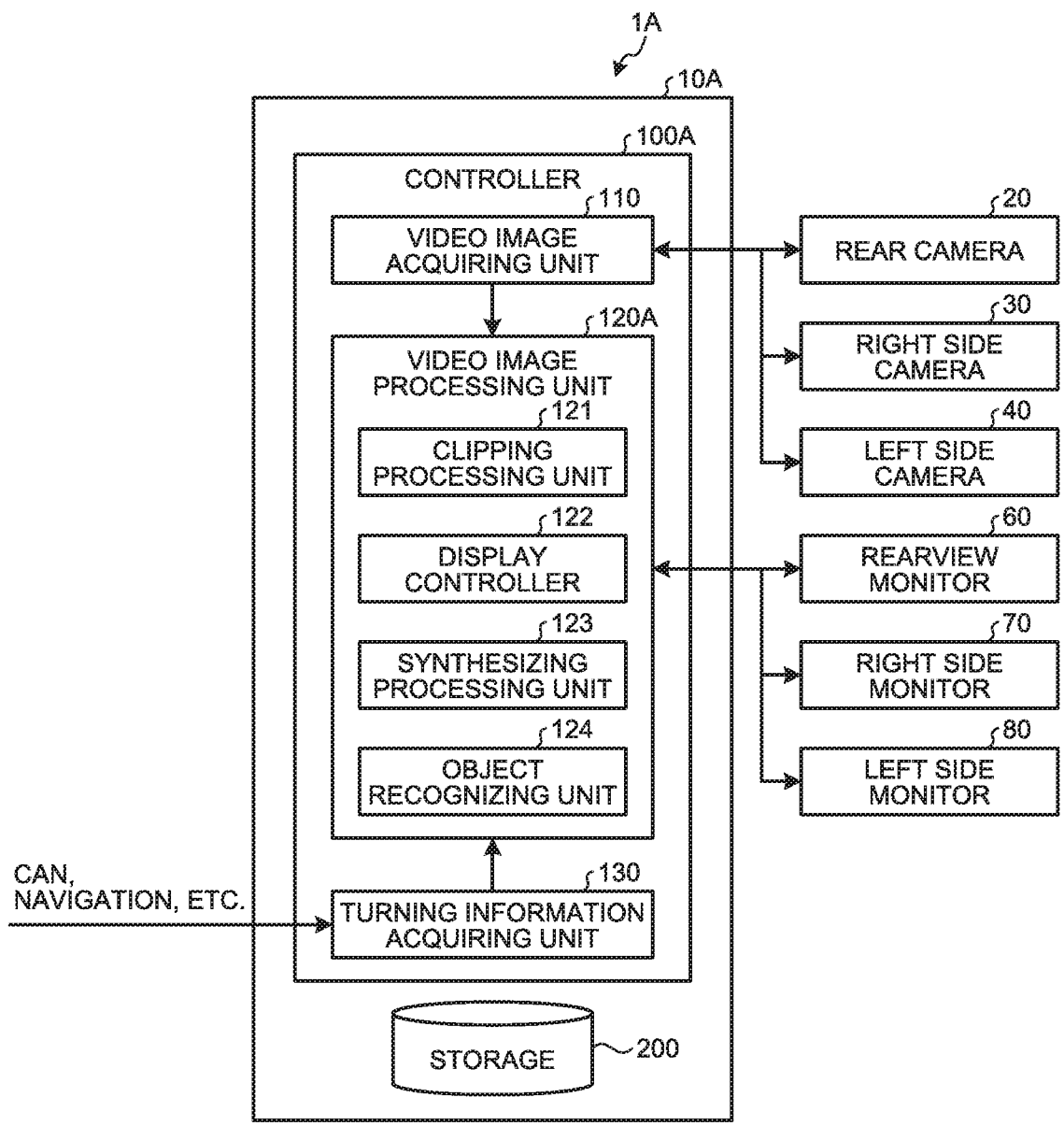
FIG. 16 is a block diagram illustrating a configuration of the on-vehicle display system according to a fourth embodiment of the present application.

In the following, an on-vehicle display system 1A according to a fourth embodiment of the present application will be described with reference to FIG. 16. FIG. 16 is a block diagram illustrating a configuration of an on-vehicle display system 1A according to the fourth embodiment of the present application.

As illustrated in FIG. 16, a video image processing unit 120A included in a controller 100A in an on-vehicle display control device 10A includes the clipping processing unit 121, the display controller 122, the synthesizing processing unit 123, and an object recognizing unit 124. Namely, the on-vehicle display system 1A is different from the on-vehicle display system 1 in that the video image processing unit 120A included in the controller 100A in the on-vehicle display control device 10A includes the object recognizing unit 124.

The object recognizing unit 124 performs an object recognition process on the video image captured by the right side camera 30 or the left side camera 40 and detects an object. The object recognizing unit 124 detects, for example, a vehicle, a motorbike, or a person from the video image captured by the right side camera 30 or the left side camera 40. The object recognizing unit 124 performs the object recognition process when, for example, a right rear view video image and a left rear view video image are being displayed on the right side monitor 70 and the left side monitor 80, respectively, and when an object has been detected, the object recognizing unit 124 reports the detection of the object to a driver. The object recognizing unit 124 may also continuously perform the object recognition process on the video image captured by, for example, the right side camera 30 or the left side camera 40 and may also report, when the object is detected, the detection of the object to the driver.

Figure 17:
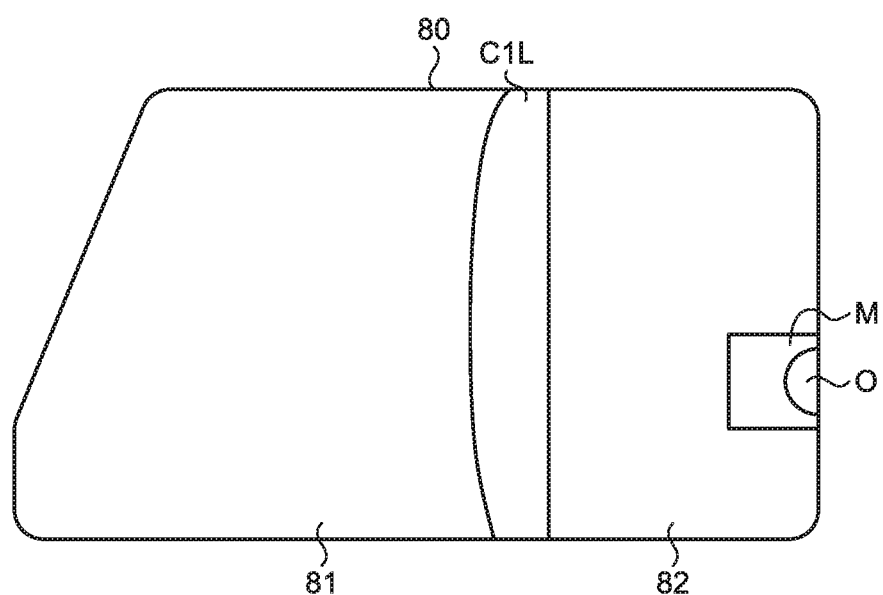
FIG. 17 is a diagram illustrating an operation of the on-vehicle display control device according to the fourth embodiment of the present application.

An operation performed in the object recognizing unit 124 will be described with reference to FIG. 17. FIG. 17 is a diagram illustrating an operation of the object recognizing unit 124.

In FIG. 17, the left side monitor 80 on making a left turn is illustrated. The object recognizing unit 124 extracts a specific object displayed on the left side monitor 80. The specific object mentioned here indicates an object that may possibly interfere with the driving and that is included in the video image displayed on the left side monitor 80. When the object recognizing unit 124 detects an object O that may possibly interfere with driving in, for example, the second display area 82, the object recognizing unit 124 encloses the object O with a square icon M. Consequently, the object recognizing unit 124 reports the detection of the object to the driver.

As described above, the embodiment can report the detection of the object to the driver when the right rear view video image and the left rear view video image are displayed on the right side monitor 70 and the left side monitor 80, respectively. Consequently, the driver can easily grasp the object in the side rear view video image in the direction opposite to the turning direction.

According to the present application, even on making a right or left turn, it is also possible to check a direction opposite to a turning direction.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle display control device comprising:
   a video image acquiring unit configured to acquire left and right side rear view video images captured by imaging units configured to capture the left and right side rear view video images of a vehicle;
   a turning information acquiring unit configured to acquire turning information on the vehicle; and
   a video image processing unit configured to display, on determining that the vehicle is going to make a turn based on the turning information, a synthesized video image such that the side rear view video image for a turning direction is displayed in an area away from a center of the vehicle in a side monitor arranged in a turning direction among left and right side monitors provided in the vehicle, and the side rear view video image for a direction opposite to the turning direction is displayed in an area close to the center of the vehicle in the side monitor arranged in the turning direction.

2. The on-vehicle display control device according to claim 1, wherein the video image processing unit is further configured to display, in the side monitor arranged in the turning direction, a synthesized video image in which a video image close to the vehicle in the side rear view video image for the turning direction and a video image away from the vehicle in the side rear view video image for the direction opposite to the turning direction are synthesized.

3. The on-vehicle display control device according to claim 1, wherein the video image processing unit is further configured to display, in the side monitor arranged in the turning direction, a synthesized video image in which a video image close to the vehicle in the side rear view video image for the turning direction and a video image close to the vehicle in the side rear view video image for the direction opposite to the turning direction are synthesized.

4. The on-vehicle display control device according to claim 3, wherein the video image processing unit is further configured to display, when the vehicle moves backward, a video image for a lower side of the vehicle in the side rear view video image.

5. The on-vehicle display control device according to claim 1, wherein the video image processing unit is further configured to change, in accordance with a rotation angle of the turning direction, a range to be clipped of the side rear view video image for the direction opposite to the turning direction to be displayed on the side monitor arranged in the turning direction.

6. The on-vehicle display control device according to claim 1, wherein
the side monitor is constituted by a laterally-long monitor configured to display the left side rear view video image in a left portion thereof and the right side rear view video image in a right portion thereof, and
the video image processing unit is further configured to display, on determining that the vehicle is making a turn based on the turning information, a synthesized video image in which the side rear view video image for the turning direction and the side rear view video image for the direction opposite to the turning direction are synthesized adjacently.

7. An on-vehicle display system comprising:
the on-vehicle display control device according to claim 1;
the imaging units; and
the side monitors.

8. An on-vehicle display control method comprising:
acquiring left and right side rear view video images captured by imaging units configured to capture the left and right side rear view video images of a vehicle;
acquiring turning information on the vehicle; and
displaying, on determining that the vehicle is going to make a turn based on the turning information, a synthesized video image such that the side rear view video image for a turning direction is displayed in an area away from a center of the vehicle in a side monitor arranged in the turning direction among left and right side monitors provided in the vehicle, and the side rear view video image for a direction opposite to the turning direction is displayed in an area close to the center of the vehicle in the side monitor arranged in the turning direction.

9. A non-transitory storage medium that stores a program that causes a computer operating as an on-vehicle display device to execute a process comprising:
acquiring left and right side rear view video images captured by imaging units configured to capture the left and right side rear view video images of a vehicle;
acquiring turning information on the vehicle; and
displaying, on determining that the vehicle is going to make a turn based on the turning information, a synthesized video image such that the side rear view video image for a turning direction is displayed in an area away from a center of the vehicle in a side monitor arranged in the turning direction among left and right side monitors provided in the vehicle, and the side rear view video image for a direction opposite to the turning direction is displayed in an area close to the center of the vehicle in the side monitor arranged in the turning direction.

* * * * *